United States Patent
Breeding et al.

(10) Patent No.: US 8,314,380 B2
(45) Date of Patent: Nov. 20, 2012

(54) ON-LINE TOF-PET MASHED REBINNING FOR CONTINUOUS BED MOTION ACQUISITIONS

(75) Inventors: John E. Breeding, Knoxville, TN (US);
William F. Jones, Knoxville, TN (US);
Wing K. Luk, Knoxville, TN (US);
Andrew P. Moor, Knoxville, TN (US);
Johnny H. Reed, Clinton, TN (US);
David Townsend, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 559 days.

(21) Appl. No.: 12/558,026

(22) Filed: Sep. 11, 2009

(65) Prior Publication Data

US 2010/0074498 A1    Mar. 25, 2010

Related U.S. Application Data

(60) Provisional application No. 61/096,026, filed on Sep. 11, 2008.

(51) Int. Cl.
*H01J 49/00*    (2006.01)
*G01T 1/161*    (2006.01)

(52) U.S. Cl. ............. 250/287; 250/363.02; 250/363.03; 250/363.04; 382/131

(58) Field of Classification Search ................. 382/131; 250/363.02–363.04, 287
See application file for complete search history.

(56) References Cited

U.S. PATENT DOCUMENTS

| | | | | |
|---|---|---|---|---|
| 4,559,597 A | * | 12/1985 | Mullani | 600/407 |
| 6,810,102 B2 | * | 10/2004 | Hsieh et al. | 378/4 |
| 7,756,315 B2 | * | 7/2010 | Hsieh et al. | 382/131 |
| 2004/0260176 A1 | * | 12/2004 | Wollenweber et al. | 600/427 |
| 2005/0253075 A1 | * | 11/2005 | Jones et al. | 250/363.04 |
| 2007/0075249 A1 | * | 4/2007 | Wang et al. | 250/363.04 |
| 2007/0269093 A1 | * | 11/2007 | Jones et al. | 382/131 |
| 2009/0072155 A1 | * | 3/2009 | Watson et al. | 250/363.03 |

\* cited by examiner

*Primary Examiner* — Alexander H Taningco
(74) *Attorney, Agent, or Firm* — Peter Kendall

(57) ABSTRACT

A patient bed drive mechanism, under control of a processor, is capable of continuously moving a patient bed through the a TOF-PET detector array having a stationary field of view (FOV) for a distance in excess of the physical extent of an axis of the array FOV. A direct memory access (DMA) rebinner card is coupled to the detector array to receive therefrom a stream of TOF-PET coincidence event data during the extent of movement of the bed. Image projection data are generated in real time from the acquired stream of TOF-PET coincidence event data via the DMA card.

20 Claims, 5 Drawing Sheets

ON-LINE TOF-PET MASHED REBINNING FOR CONTINUOUS BED MOTION ACQUISITIONS

RELATED APPLICATIONS

Priority is claimed under 35 U.S.C. §119(e) from copending provisional application Ser. No. 61/096,021, filed Sep. 11, 2008. This application is related to application Ser. No. 11/749,434, filed May 16, 2007.

BACKGROUND

The present disclosure relates to Positron Emission Tomography (PET) data acquisition, more particularly to effecting continuous bed motion (CBM) data acquisition in clinical time of flight (TOF) tomography.

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by a scintillation crystal, with which the photons interact to produce flashes of light or "events." Events are detected by an array of photodetectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred.

Time-of-flight positron emission tomography (TOF-PET) is based on the measurement of the difference between the detection times of the two gamma photons arising from the positron annihilation event. This measurement allows the annihilation event to be localized along the LOR with a adequate resolution.

Horizontal motion of the patient handling system (bed) traversing through the PET detector array is often needed during a single patient session for obtaining an elongated whole-body study. Such study requires acquisition of data to generate a single three dimensional image that typically extends from the patient's neck on through the pelvis area or further. The length of the subject image exceeds the physical extent of the axis of the stationary field of view (FOV) formed by the PET detector array. Traditionally, a "step and shoot" mode of whole body scanning is used for this purpose. The patient bed is moved to several fixed horizontal positions during the acquisition. These positions are typically overlapping and distributed along the patient thorax, with a separate static acquisition for each position. As each stationary acquisition completes, the bed will quickly move the patient to the next fixed position to service the start of the next step acquisition. The resulting static acquisitions may be separately reconstructed, with each image representing only the axial length of the stationary FOV. The resulting three dimensional images may be joined via voxel-summation in the overlapping regions to form a single assembled image. This single image represents an elongated region of the patient, typically with an axial length of 80 to 100 cm or more.

Techniques are needed to support effective data collection for a scanning mode in which the patient bed may be moved horizontally on a largely continuous basis, essentially without stopping, throughout one uninterrupted period of data acquisition. Continuous bed motion (CBM) would eliminate the "step and shoot" mode acquisitions that involve brief periods of rapid slewing movements between overlapping stationary bed positions in which acquisition of PET data is disabled.

These techniques should support effective CBM data collection for TOF, TOF-Mashing, and precise on-line mapping (rebinning) of physical LOR locations along the FOV axis into the projection data space. Data collection must be modified in real time with the horizontal movement of the patient bed. "Mashing" is a convenient short-hand expression in common use which refers to less precise transaxial angular sampling in the projection data space. TOF mashing enables acquisition of projection data sets that take up less memory space while preserving image resolution.

DISCLOSURE

The above described needs are fulfilled, at least in part, by a system including a TOF-PET detector array having a stationary field of view (FOV). A patient bed drive mechanism, under control of a processor, is capable of continuously moving a patient bed through the detector array for a distance in excess of the physical extent of an axis of the array FOV. A direct memory access (DMA) rebinner card is coupled to the detector array to receive therefrom a stream of TOF-PET coincidence event data during the extent of movement of the bed. The processor generates image projection data in real time from the acquired stream of TOF-PET coincidence event data via the DMA card. The DMA rebinner card may include a router field programmable gate array (FPGA), a plurality of logic FPGAs coupled to the Router FPGA, and an array of memory chips coupled to each logic FPGA. The memory chips are configured with look-up tables (LUT) to service computations usable to for map detector-pair coincidence data into projection space data.

The DMA rebinner card, which may be comprised of a Petlink™ DMA rebinner (PDR), supports on-line time-of-flight (TOF) mashing along with TOF-MSRB (multiple-slice rebinning) and nearest-neighbor rebinning into a linear projection data space. The DMA rebinner card outputs a stream of bin address packets that can be used by the processor to perform on-line histogramming. Histogrammed data may be stored in DRAM and collected in a redundant array of independent disks (RAID).

The system generates image projection data by mapping line of response (LOR) data received from the detector array. Data relating the position of the patient bed to the detector array FOV are tracked and recorded. Mapped image projection data are compensated in accordance with the tracked position data. A proper axial index may be determined for each coincident/LOR event, the index dependent upon the bed position when each coincident event is detected.

Additional advantages of the present disclosure will become readily apparent to those skilled in this art from the following detailed description, wherein only preferred embodiments of the invention are shown and described, simply by way of illustration of the best mode contemplated of carrying out the invention. As will be realized, the invention is capable of other and different embodiments, and its several details are capable of modifications in various obvious respects, all without departing from the disclosed concepts. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
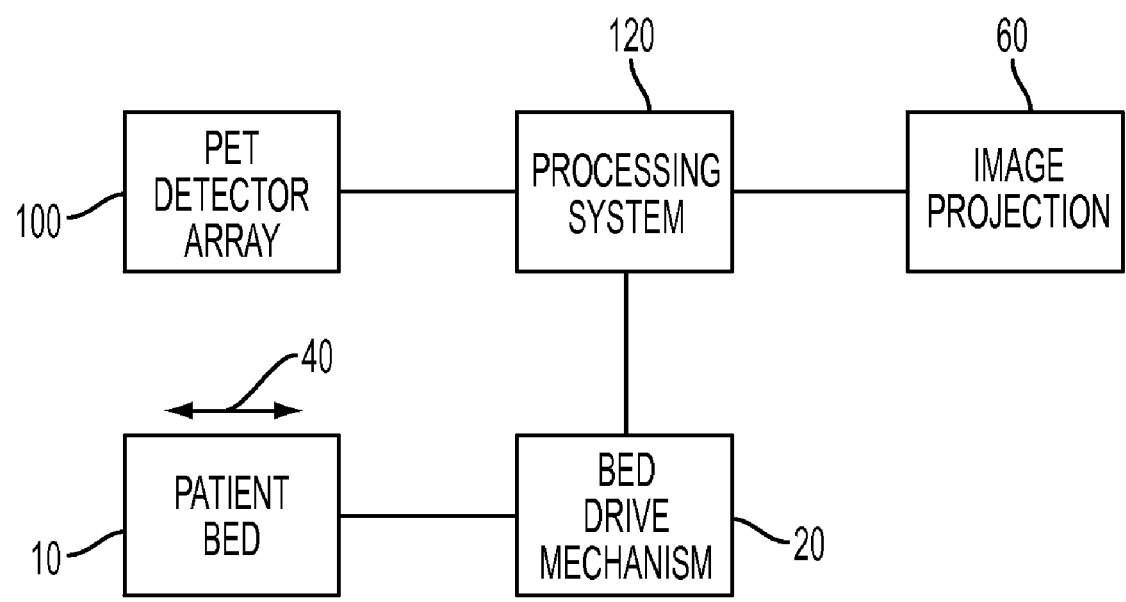
FIG. 1 is a block diagram that is illustrative of a TOF-PET (time of flight-Positron Emission Tomography) nuclear imaging device capable of continuous bed motion (CBM) data acquisition.

The block diagram shown in FIG. 1 is illustrative of a system in which a patient bed 10 is capable of continuous movement, by bed drive mechanism 20, with respect to PET detector array 100. Detector array 100 is housed within a known gantry configuration that encompasses the patient bed support mechanism. the detector array provides a field of view (FOV) for a finite extent along a horizontal axis. Continuous movement of the bed is advanced through the detector array in the horizontal axis direction, as indicated by arrow 40 for a distance that can exceed the physical extent of an axis of the detector stationary field of view. "Continuous bed movement (CBM)" implies that data acquisition of data may continue without pause throughout the entire PET whole body data collection.

Processing system 120, discussed more fully hereafter, is coupled to both the detector array 100 and the bed drive mechanism 20. Drive mechanism 20 comprises a motor and operating circuit therefor that is responsive to output from the processing system 120. Processing system 120 receives TOF-PET coincidence event data from the detector array while a continuous bed movement scan session occurs. The processing system 120 generates image projection data to display device 60 in real time.

In CBM imaging, a burden is placed on data acquisition to ensure that, as the patient/bed moves continuously through the FOV, the acquisition system carefully tracks and records in real-time the horizontal position of the patient/bed relative to the FOV. This position information must eventually be used to compensate the LOR-to-projection-space mapping. This CBM mapping requires that the real-time synchrony be preserved between the patient/bed location and the PET coincidence data collected, both of which change over time. To that end, the horizontal patient/bed position is incorporated in real-time into the PET coincidence event packet stream via tag packet insertion.

Figure 2:
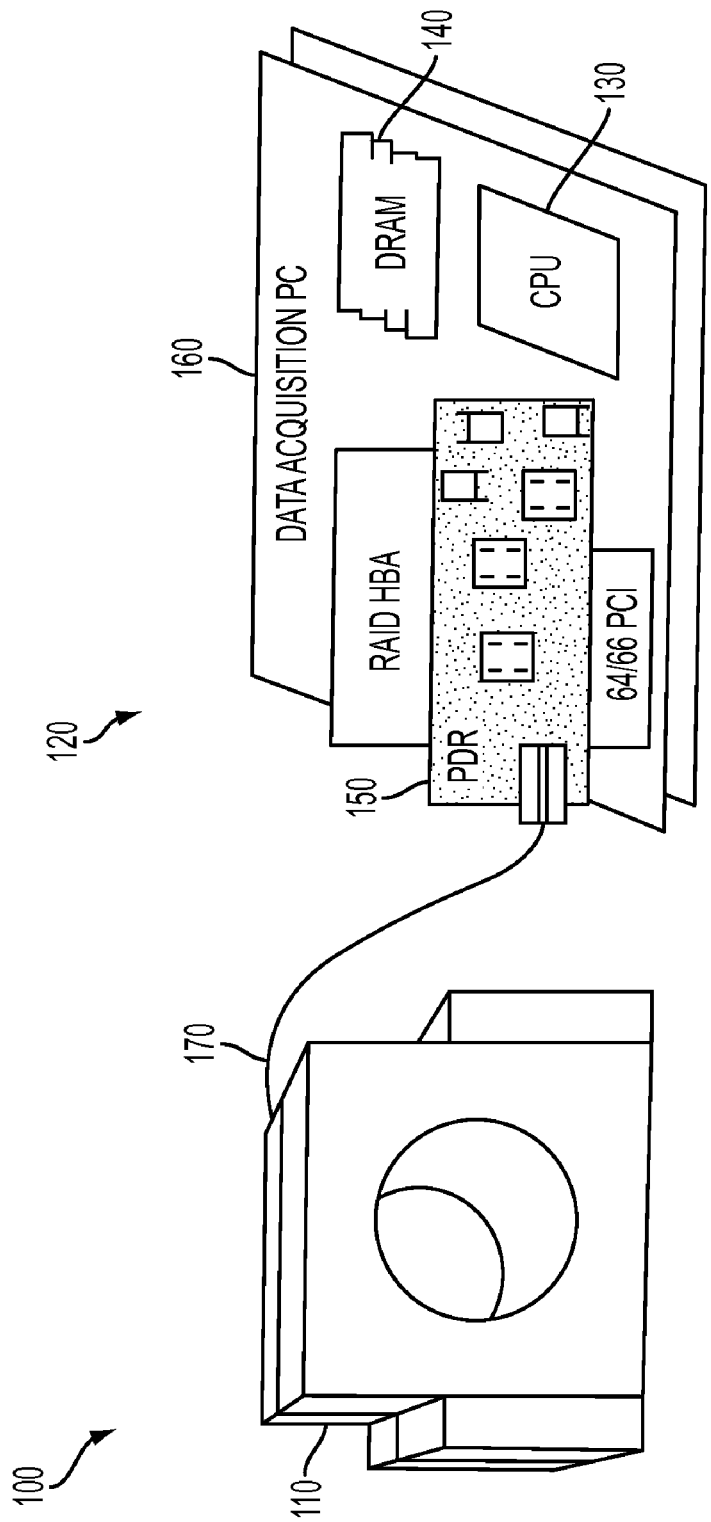
FIG. 2 is system diagram for data acquisition in service to a Long-Axis TOF PET/CT apparatus.

FIG. 2 depicts a system 100 for data acquisition in service to any suitable Long-Axis TOF PET/CT device 110. In one embodiment, TOF PET/CT device 110 may comprise 52 rings of (4×4×20 mm) LSO crystals (624 crystals/ring), a 70 cm diameter field of view (FOV) with a 22 cm axial length, and a 500 ps full width at half maximum (FWHM) time of flight (TOF) resolution. The primary output of TOF PET/CT device 110 may be a data stream over fiber optic line 170. However, any method of sending data from TOF PET/CT device 110 to a processor may be used. Fiber optic stream 170 may have 64-bit detector pair packets. Each packet may comprise a 6-bit field for TOF encoding.

During data acquisition, each TOF bin (out of 60) may be over sampled at 78 ps. Fiber optic stream 170 may be coupled to a data acquisition processor 120. Processor 120 may contain local Redundant Array of Independent Disks (RAID) 160 and a direct memory access (DMA) rebinner card 150. DMA rebinner card 150 may be a Petlink™ DMA rebinner (PDR) made by Siemens, or DMA rebinner card 150 may be any other card capable of supporting on-line TOF mashing along with TOF-MSRB and nearest-neighbor rebinning into a "linear" projection data space.

The primary output from PDR 150 is a stream of 32-bit bin-address packets. The 30-bit bin-address field in this packet may be directly applied for histogramming into the final "mashed" projection data set. The CPU 130 on processor 120 receives these 32-bit packets and performs on-line histogramming as directed by the 30-bit bin-address content of each packet. CPU 130 may histogram directly into a server-resident DRAM 140. Thereafter, the instantly-completed projection data set may be transferred to local RAID 160. Alternatively, the bin-address packets may be stored directly to RAID 160 (or similar storage medium) in a list-mode data acquisition, for later processing. Processor 120 may have an output device capable of outputting the data so that it may be analyzed or reconstructed into 3-D image data, including but not limited to an interne connection, a printer, a monitor, etc.

The principal CBM technique required for LOR-mapping into the projection data set is to determine the proper axial index into the elongated projection data space for each coincidence/LOR event. The index is dependent upon the horizontal patient/bed position reported when each coincidence event was detected. A simple algebraic summing is performed, once respective +/− signs are set correctly, of the physical offset of each LOR along the stationary FOV axis and the respective offset for the horizontal bed position. A good characterization of the physical axial offset of each LOR into the stationary FOV and a good measurement and reporting of the absolute bed position, provided by rebinning calculation, yields a projection data space with integrity sufficient to generate optimal axial resolution in the final three dimensional volume image.

Figure 3:
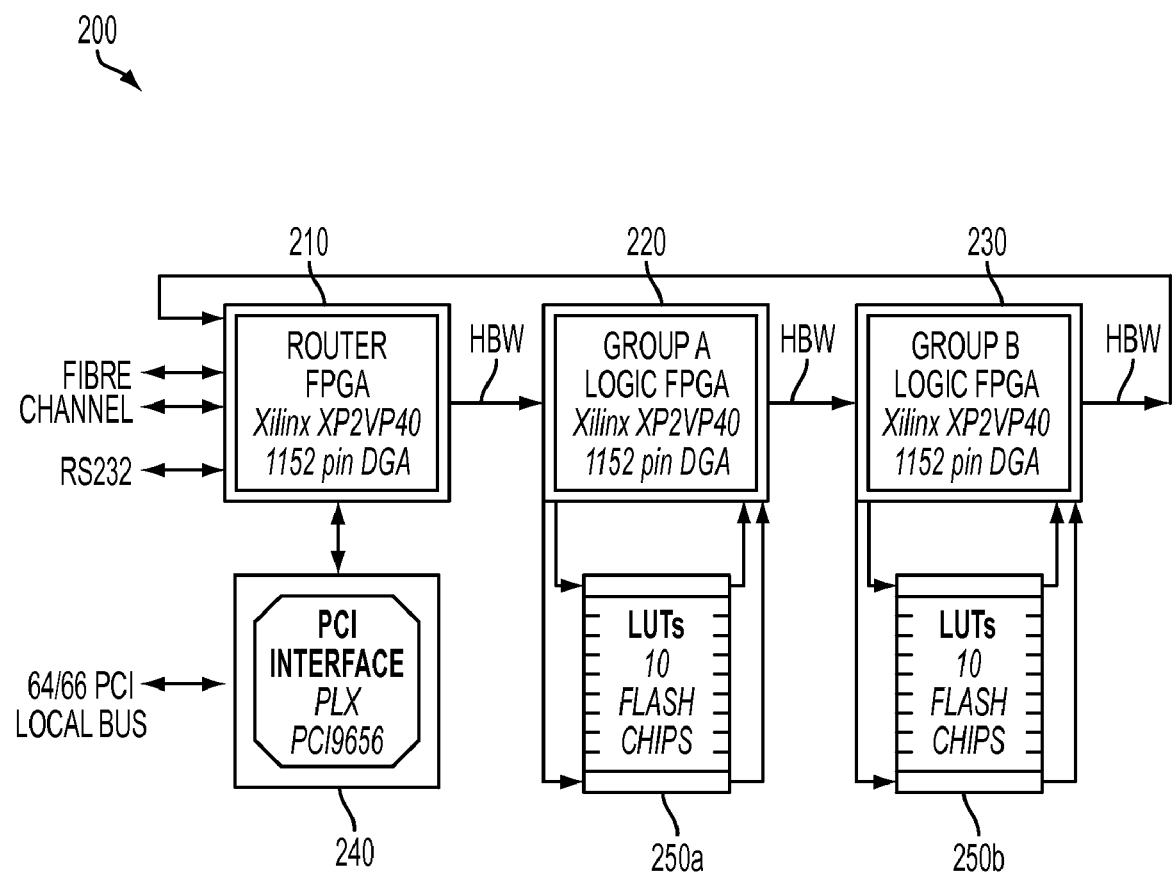
FIG. 3 is a block diagram of flexible integrated circuit chip architecture.

The PDR makes use of FPGA and flash memory chips configured in a digital pipeline for the rapid, on-line and real-time computations necessary for LOR-to-projection-space rebinning. FIG. 3 shows a block diagram and chip architecture for a PDR card 200. 64-bit detector-pair packets may arrive into the Router Field Programmable Gate Array (FPGA) 210 via a fiber optic stream. A digital pipeline may be formed using two Logic FPGAs 220 and 230. Each of Logic FPGAs 220 and 230 may be coupled to an array of ten 8 Mbyte flash memory chips 250(a) and (b). Flash memory chips 250(*a*) and (*b*) may be programmed to provide look-up tables (LUT) to service the computations required for mapping from detector-pair space into projection data space. The output of the pipeline may be returned to Router FPGA 210 and then outputted by PCI DMA interface 240 in 32-bit bin-address packet form.

Figure 4:
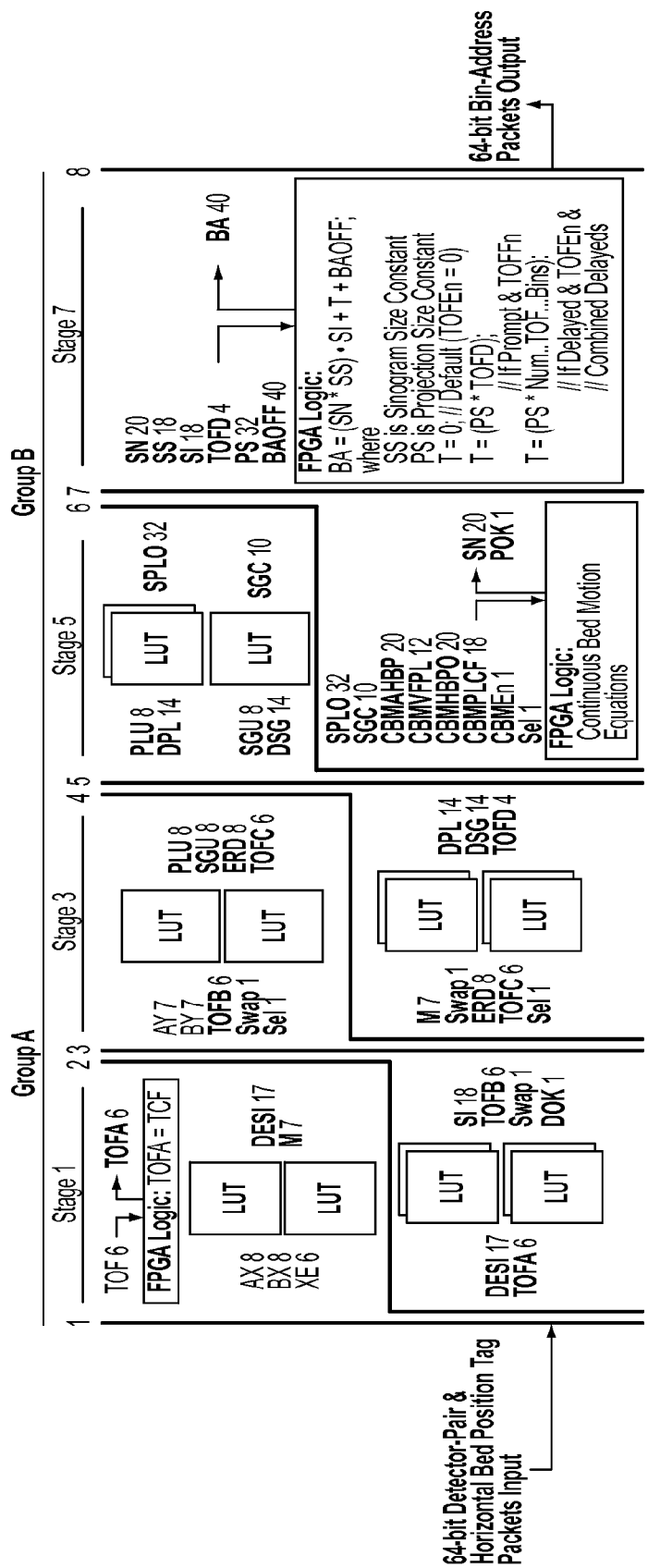
FIG. 4 is a diagram of an embodiment of a PDR digital pipeline as applied to the Long-Axis TOF PET system.

FIG. 4 illustrates one embodiment of the PDR digital pipeline as applied to the Long-Axis TOF PET/CT device. In this embodiment, there is a seven-stage digital pipeline flowing from left to right. 64-bit detector-pair data packets may be inputted to the pipeline. Each black line 1-8 represents digital FPGA latches of at least 64-bit capacity. Each of the blocks labeled LUT represents a 4M×16-bit flash memory chip with input parameter labels on the left (address) and output labels on the right (data). Throughput for the pipeline may be 13 to 15 M sustained packets/second. Stage 1 may generate a preliminary 17-bit "detector encoded" transaxial sinogram index (DESI 17) and an 8-bit "axial correction" parameter (M 8). These Stage 1 outputs result from the transaxial detector pair indexes (AX, BX and XE). Note the "placeholder" for the incoming 6-bit TOF value (TOF 6) means TOFA may be set equal to TOF.

Stage 2 may generate a final transaxial sinogram index (SI 17) from DESI 17 and the incoming 6-bit TOF value (TOFA 6). In addition, a transaxially rebinned TOF value is outputted (TOFB 6). Stage 2 may also generate a SWAP bit for controlling the detector pair orientation—i.e. A×B vs. B×A. It may also generate a single bit indicator for "inside FOV diameter" (DOK 1). Stage 3 may generate an 8-bit uncorrected "plane" (PLU 8) and "segment" (axial angle or SGU 8) indexes with an "encoded ring difference" (ERD 8) value from the axial detector-pair indexes (AY, BY, etc.). The TOF values may pass unmodified though Stage 3 so TOFC=TOSB. Stage 4 may generate a 14-bit "delta" correction for both the plane (DPL 14) and segment (DSG 14). In addition, Stage 4 may generate a 4-bit TOF value (TOFD 4) which represents TOF values −7 through +7.

The SPLO signal generated by Stage 5 represents a positive block-floating integer value which can represent the physical axial offset within the stationary PET-array FOV for each arriving LOR event packet. The signal SPLO makes use of precisely-known mechanical locations for the PET-detector-array crystals and of the extensive physics modeling of gamma-photon detection relative to each scintillating crystal with the PET detector array. SPLO may be defined with an implied decimal to the left of 17 fractional bits. Bit 18 in the SPLO value would represent 0.001 cm in axial offset.

The incoming parameter, PLU, represents the lesser value of the AY/BY pair as determined by Stage 3. The incoming parameter, DPL, is a 14-bit block floating integer which is always positive. As determined by Stage 4, DPL mostly represents the axial distance from the center of the "PLU" ring and the point along each LOR nearest the FOV axis. Stage 4 also makes use of TOF information to apply a small axial-resolution-improving adjustment to DPL. The value chosen for DPL=1 may represent 0.001 cm of axial length. In this case, the maximum value which the 14-bit DPL can represent is 16.383 cm, which is more than adequate.

The chosen precision limit for DPL (0.001 cm) is a convenience to equal the horizontal bed movement precision (0.001 cm). The precision settings may result in effectively oversampling the typical axial image resolution of up to a factor of 300. Such on-line CBM rebinning will be effective without compromise. Within the C-code which determines LUT content of the LUT in Stage 5, the actual physical placement along the FOV axis of the center of each crystal ring is known with precision and is based upon the supplied mechanical drawings for the PET crystal array. The ring-number value represented by PLU can thus easily be converted by C-code into a precise physical length.

Stage 6 contains the following elements. SPLO represents a stationary plane offset, input from Stage 5. SGC, input from Stage 5, represents segment correction. CBMAHBP represents continuous bed motion virtual FOV plane length, is input from an FPGA-resident register which is loaded prior to start of acquisition by, for example, Windows application code via PCI bus; and is an always positive and always odd integer value which partially specifies, in combination with CBMPLF (described below), the desired axial extent of the CBM projection data space. This value represents the number of sinograms present in Segment Zero of the CBM Michelogram space. This value is derived from the user interaction with a "scout scan" image which is a part of the PET setup. CBMHBPO represents continuous bed motion horizontal bed position offset and is input from an FPGA-resident register, which is loaded prior to start of acquisition, for example, by Windows application code via PCI bus. The value represents the absolute horizontal bed position which will cause precise alignment between the stationary detector array "plane 0" and the elongated CBM projection-space "plane 0." "Plane 0" may be the direct plane farthest from the bed-side of the PET/CT system. The value may be defined as the user performs graphical drag/draw of a rectangle on the scout-scan CT image prior to start of the acquisition. CBMLCF represents continuous bed motion plane correction factor, with always a positive integer value and is input from an FPGA-resident register is loaded prior to start of acquisition by Windows application code via PCI bus. CBMEN represents continuous bed motion enable and is input from an FGPA-resident register which is loaded prior to start of acquisition by Windows application code via PCI bus.

Once the on-line CBM data acquisition is complete, the elongated CBM projection data set will be sent for reconstruction. The format of this projection space is largely compatible with a traditionally formatted projection space.

Figures 5, 6:
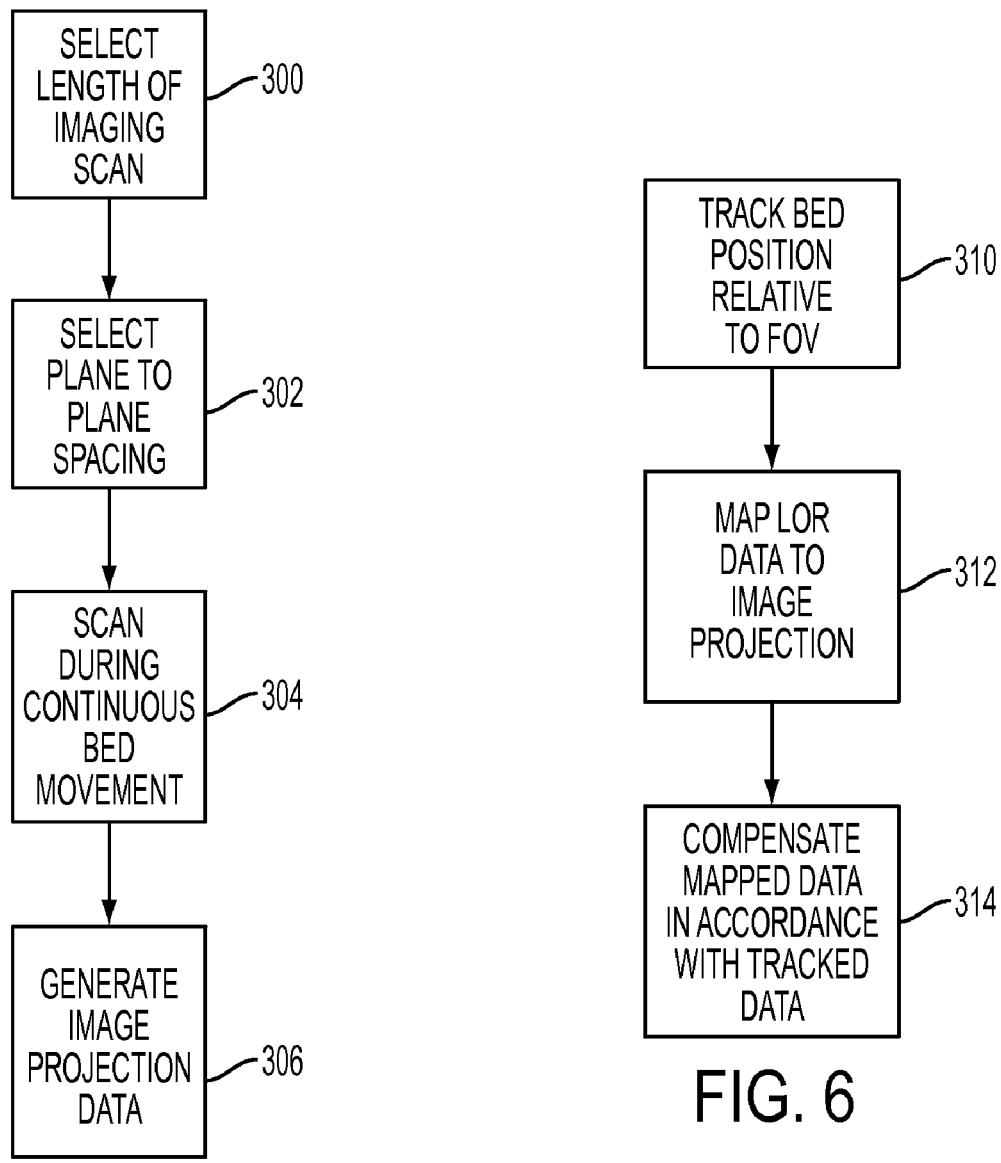
FIG. 5 is a flow chart of TOF-PET CBM operation.
FIG. 6 is a flow chart of image projection generation.

FIG. 5 is a broad flow chart of TOF-PET CBM operation. Initially, as step 300, the user selects the length of the imaging scan, based on the dimensions of the portion of patient's body of interest. Plane-to-plane spacing is then determined by selection of the user at step 302. At step 304 a single scan session is performed while the bed is moved continuously through the PET detector for the length selected in step 300. At step 306, image projection data are generated from the stream of TOF-PET coincidence event data acquired continuously during the extent of movement of the bed during the scan of step 304.

FIG. 6 is a broad flow chart of the image projection generation step 306. At step 310, the information received during the scan of step 304 is used to track the bed position relative to the field of view of the detector array. At step 312, LOR data are mapped to image projection space. At step 314, the mapped data from step 312 is compensated in accordance with the tracked data obtained in step 310 to produce the image projection data for display or storage.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, the concepts of the present disclosure are applicable to various other reference and shift patterns and to exposure to other balanced light sources.

What is claimed is:

1. A method comprising:
continuously moving a patient bed through a detector array of a TOF-PET (time of flight-Positron Emission Tomography) nuclear imaging device for a distance in excess of the physical extent of an axis of the stationary field of view (FOV) formed by the detector array;
conducting a TOF-PET imaging scan to continuously acquire a stream of TOF-PET coincidence event data during the extent of movement of the bed without pause throughout entire PET whole body data collection; and
generating image projection data in real time from the acquired stream of TOF-PET coincidence event data,
wherein a position of the patient bed is incorporated in real-time into TOF-PET coincidence event packet stream via tag packet insertion.

2. The method of claim 1, wherein the step of generating image projection data comprises mapping line of response (LOR) data received from the detector array.

3. The method of claim 2, wherein the step of conducting further comprises outputting the stream of TOF-PET coincidence event data to a direct memory access (DMA) rebinner card.

4. The method of claim 3, further comprising outputting bin address data associated with the coincidence event data stream, and the step of mapping comprises accessing the bin address data.

5. The method of claim 3, further comprising storing the bin address data in a list mode acquisition.

6. The method of claim 1, wherein the step of conducting comprises tracking and recording data relating the position of the patient bed to the detector array FOV.

7. The method of claim 6, wherein the step of generating image projection data comprises compensating the step of mapping in accordance with the tracked position data.

8. The method of claim 7, wherein the step of compensating comprises determining a proper axial index for each coincident/LOR event, the index dependent upon the bed position when each coincident event is detected.

9. The method of claim 1, further comprising initially selecting a specific length desired for the imaging scan and selecting plane to plane spacing for each on-line acquisition;
wherein the extent of patient bed movement corresponds to the selected length.

10. A system comprising:
a TOF-PET (time of flight-Positron Emission Tomography) detector array having a stationary field of view (FOV);
means for continuously moving a patient bed through the detector array for a distance in excess of the physical extent of an axis of the array FOV;
a direct memory access (DMA) rebinner card coupled to the detector array to receive therefrom a stream of TOF-PET coincidence event data which is continuously acquired without pause throughout entire PET whole body data collection during the extent of movement of the bed; and
a processor coupled to the DMA card;
wherein the processor is configured to generate image projection data in real time from the acquired stream of TOF-PET coincidence event data, and
wherein a position of the patient bed is incorporated in real-time into TOF-PET coincidence event packet stream via tag packet insertion.

11. The system of claim 10, wherein the processor is configured to track and record data relating the position of the patient bed to the detector array FOV.

12. The system of claim 11, wherein the processor is configured to map line of response (LOR) data received from the detector array and to compensate mapping in accordance with the tracked position data.

13. The system of claim 12, wherein compensation comprises determining a proper axial index for each coincident/LOR event, the index dependent upon the bed position when each coincident event is detected.

14. The system of claim 10, wherein the DMA rebinner card is configured to support on-line time-of-flight (TOF) mashing along with TOF-MSRB (multiple-slice rebinning) and nearest-neighbor rebinning into a linear projection data space.

15. The system of claim 14, wherein the DMA rebinner card comprises a Petlink™ DMA rebinner (PDR).

16. The system of claim 10, wherein the DMA rebinner card is configured to output a stream of bin address packets and the processor is configured to perform on-line histogramming directed by the bin address content of each packet.

17. The system of claim 16, further comprising a dynamic access memory (DRAM) coupled to the processor for storing histogrammed data.

18. The system of claim 17, further comprising a redundant array of independent disks (RAID) configured to collect stored histogrammed data.

19. The system of claim 10, wherein the DMA rebinner card comprises:
a router field programmable gate array (FPGA);
a plurality of logic FPGAs coupled to the Router FPGA; and
an array of memory chips coupled to each logic FPGA.

20. The system of claim 10, further comprising a plurality of memory chips coupled to the processor, the memory chips configured with look-up tables (LUT) to service computations usable to for map detector-pair coincidence data into projection space data.

* * * * *